United States Patent [19]

Roberts et al.

[11] Patent Number: 5,290,954
[45] Date of Patent: Mar. 1, 1994

[54] HIGH CLARITY EMULSIONS CONTAINING HIGH MELT VISCOSITY MALEATED POLYPROPYLENE WAX

[75] Inventors: Thomas D. Roberts; Thomas W. Smith, both of Longview, Tex.; Charlene A. Galvin, Piney Flats, Tenn.

[73] Assignee: Eastman Kodak Company, Rochester, N.Y.

[21] Appl. No.: 929,934

[22] Filed: Aug. 13, 1992

[51] Int. Cl.$^5$ ............................................. C07D 307/60
[52] U.S. Cl. ................................. 549/233; 427/407.1
[58] Field of Search ....................... 549/313, 315, 233; 427/407.1

[56] References Cited

U.S. PATENT DOCUMENTS

| | | |
|---|---|---|
| 2,969,345 | 1/1961 | Coover et al. . |
| 3,414,551 | 1/1968 | Reid et al. . |
| 3,416,990 | 12/1968 | Robinson . |
| 3,437,550 | 4/1969 | Paul . |
| 3,480,580 | 4/1969 | Joyner et al. . |
| 3,481,910 | 12/1969 | Brunson . |
| 3,483,276 | 12/1969 | Mahlman . |
| 3,590,076 | 6/1971 | Heintzelman et al. ............ 549/233 |
| 3,642,722 | 2/1972 | Knowles et al. . |
| 3,746,676 | 7/1973 | Joyner et al. . |
| 3,859,386 | 1/1975 | Mainond ............................ 525/301 |
| 3,862,265 | 1/1975 | Steinkamp et al. . |
| 3,928,687 | 12/1975 | Wada et al. . |
| 3,932,368 | 1/1976 | McConnell et al. . |
| 3,953,541 | 4/1976 | Fuji . |
| 4,003,874 | 1/1977 | Ide et al. . |
| 4,026,967 | 5/1977 | Flexman et al. . |
| 4,028,436 | 1/1977 | Bogan et al. . |
| 4,031,062 | 6/1977 | Shirayama et al. . |
| 4,071,494 | 1/1978 | Gaylord . |
| 4,078,017 | 3/1978 | Nagatoshi et al. . |
| 4,218,263 | 8/1980 | Kawabata et al. . |
| 4,299,754 | 11/1981 | Shiomi et al. . |
| 4,315,863 | 2/1982 | Tomoshige et al. . |
| 4,347,341 | 8/1982 | Bartl et al. . |
| 4,358,564 | 11/1982 | Ames . |
| 4,370,450 | 1/1983 | Grigo et al. . |
| 4,376,855 | 12/1983 | Ames . |
| 4,443,584 | 4/1984 | Michel . |
| 4,506,056 | 3/1985 | Gaylord . |
| 4,533,700 | 8/1985 | Mizui et al. . |
| 4,538,993 | 10/1985 | Garagnani et al. . |
| 4,612,155 | 9/1986 | Wong et al. . |
| 4,613,679 | 9/1986 | Mainord . |
| 4,624,992 | 11/1986 | Milani et al. . |
| 4,632,962 | 12/1986 | Gallucci . |
| 4,639,495 | 1/1987 | Waggoner . |
| 4,693,838 | 9/1987 | Varma et al. . |
| 4,727,120 | 2/1988 | Nogues . |

(List continued on next page.)

OTHER PUBLICATIONS

Polymer Chemistry by M. P. Stevens, (Addison-Wesley), 1975, pp. 196–202.
N. G. Gaylord et al, Journal of Applied Polymer Science, 44, 1941 (1992) and reference cited therein.
Derwent Abstract WPI Acc No: 88-243913/35 (EP 280454), Aug. 1988.
Derwent Abstract WPI Acc No: 77-15656Y/09 (JP 77 08,035), Jan. 1977.
Derwent Abstract WPI Acc No: 77-65953Y/37 (JP 77 93,495), Aug. 1977.

(List continued on next page.)

*Primary Examiner*—Vasu S. Jagannathan
*Attorney, Agent, or Firm*—Mark A. Montgomery; William P. Heath, Jr.

[57] ABSTRACT

A process is provided for the production of an emulsifiable polypropylene wax having a melt viscosity from 1000 to 5000 cP at 190° C. This process entails reacting at a temperature below 190° C. a thermally degraded polypropylene wax having a melt viscosity below 1000 cP (at 190° C.) with maleic anhydride in the presence of a free radical source. Floor polish formulations containing this polypropylene wax are very clear but yet provide floor finishes that are very tough.

7 Claims, No Drawings

U.S. PATENT DOCUMENTS

| | | |
|---|---|---|
| 4,749,505 | 6/1988 | Chung et al. . |
| 4,751,270 | 6/1988 | Urawa et al. . |
| 4,762,890 | 8/1988 | Strait et al. . |
| 4,780,228 | 10/1988 | Gardiner et al. . |
| 4,822,688 | 4/1989 | Nogues . |
| 4,839,423 | 6/1989 | Moriya et al. . |
| 4,857,254 | 8/1989 | Wong . |
| 4,857,600 | 8/1989 | Gross et al. . |
| 4,869,934 | 9/1989 | Jethwa . |
| 4,877,841 | 10/1989 | Moriya et al. . |
| 4,879,347 | 11/1989 | Moriya et al. . |
| 4,880,470 | 11/1989 | Hyche et al. .......................... 524/276 |
| 4,927,888 | 5/1990 | Strait et al. . |
| 4,987,190 | 1/1991 | Keogh . |
| 5,001,197 | 3/1991 | Hendewerk . |
| 5,021,510 | 6/1991 | Vroomans . |

OTHER PUBLICATIONS

Derwent Abstract WPI Acc No: 79-03192B/02 (JP 78 137,292), Nov. 1978.

Derwent Abstract WPI Acc No: 82-31739E/16 (Jp 82 42,736), Mar. 1982.

Derwent Abstract WPI Acc No: 84-185789/30 (JP 84 105,053), Jun. 1984.

Derwent Abstract WPI Acc No: 89-036097/05 (JP 88 309,540), Dec. 1988.

Derwent Abstract WPI Acc No: 68-31066Q/00 (JP 69 15,422), 1984.

Derwent Abstract WPI Acc No: 68-31067Q/00 (JP 69 15,423), 1984.

Derwent Abstract WPI Acc No: 80-70751C/40 (JP 80 34,244), Sep. 1980.

HIGH CLARITY EMULSIONS CONTAINING HIGH MELT VISCOSITY MALEATED POLYPROPYLENE WAX

FIELD OF THE INVENTION

This invention relates to a novel process for producing a maleated polypropylene wax with high melt viscosity from which high clarity emulsions can be prepared.

BACKGROUND OF THE INVENTION

Grafting of high and low molecular weight polymers has been reported often in the literature [see for example, polymer textbook "Polymer Chemistry" by M. P. Stevens, (Addison Wesley), 1975, pp 196–202]. Maleation is a subgroup of grafting. Those skilled in the art recognize the highly individualistic nature of the maleation processes which have been patented. For example, direct maleation of polyethylenes results in cross-linking which increases the molecular weight of the polymer [see for example, "Journal of Applied Polymer Science", 44, 1941, N. G. Gaylord et al (1992); and U.S. Pat. Nos. 4,026,967, 4,028,436, 4,031,062, 4,071,494, 4,218,263, 4,315,863, 4,347,341, 4,358,564, 4,376,855, 4,506,056, 4,632,962, 4,780,228, 4,987,190, and 5,021,510]. Often free radical initiated maleation of polyethylenes is limited to very low acid numbers in order to prevent gelation due to excessive crosslinking. Thermal maleations without the use of initiators is also employed for maleation of polyethylenes in order to minimize crosslinking. Other techniques such as the addition of chain transfer agents or special reagents have been reported. On the other hand maleation of polypropylenes progresses easily with free radical initiation (see U.S. Pat. Nos. 3,414,551, 3,480,580, 3,481,910, 3,642,722, 3,746,676, 3,932,368, and 4,613,679). The molecular weight of the products of such reactions are lower than that of the starting polypropylene due to accompanying degradation reactions.

Different techniques of maleation yield different product types. Solid state maleations, those carried out below the melting point of the polymer, occur on the exposed surface of the solid. The acid numbers attained are necessarily a function of exposed surface area. Solvent based processes dissolve the polymer and produce a much more uniform maleated product [see U.S. Pat. Nos. 3,416,990, 3,437,550, 3,483,276, 3,928,687, 4,078,017, 4,299,754, 4,624,992, and 4,693,838 and Japanese Patents 59 105,053, 84 105,053 (1984), 69 15,422 (1969), 69 15,423 (1969), 77 93,495 (1977), 80 34,224 (1980), and 82 42,736 (1982). Solvent removal and recycling is an added expense of such processes however. An extruder serves as the reactor in some processes and provides some decrease in the molecular weight of the polymer due to mechanical tearing of the polymer chains [see U.S. Pat. Nos. 3,862,265, 4,003,874, 4,548,993, 4,639,495, 4,751,270, 4,762,890, 4,857,600, 4,927,888, and 5,001,197 and Japanese Patents JP 63,309,540, 88,309,540 (1988) and JP 78,137,292 (1978) and European Patent Application EP 280454 (8/31/88)]. Some other processes resort to other chemical reactions such as oxidation or reaction with an alcohol or amine, either before maleation or after maleation, to provide unique products [see U.S. Pat. Nos. 4,443,584 and 4,727,120 and Japanese Patent JP 77 08,035 (1975)]. In other processes copolymers are used to alter the molecular weight increases as in maleation of polyethylenes or the molecular weight decreases as in maleation of polypropylenes (see U.S. Pat. Nos. 3,953,541, 4,533,700, 4,612,155, 4,749,505, and 4,822,688). Finally, the processes which are carried out in water must involve maleation with a mixture of maleic acid and maleic anhydride at best, and possibly involve maleic acid exclusively (see U.S. Pat. Nos. 4,370,450, 4,839,423, 4,877,841, and 4,879,347). The product of these aqueous processes are necessarily the carboxylic acids rather than the anhydrides which are obtained in other maleation reactions.

Maleated polypropylene waxes and emulsions containing these waxes are known in the commercial field and to the chemical literature as disclosed above. The use of maleated polypropylene waxes in floor polish formulations to provide black heel mark protection is practiced. However, heretofore maleation of polypropylene waxes has provided products which gave semi-opaque emulsions. For example emulsions prepared from Epolene E43 (a maleated polypropylene wax from Eastman Chemical Company) typically exhibited less than 5.3% light transmittance (20 mm pathlength at 520 nm). This meant that use of these emulsions in floor polish formulations to provide better black heel mark resistance was limited to products which were less than completely clear. Maleated polypropylene waxes which provide higher clarity emulsions should yield an advantage in the clarity of the final floor polish which contain these waxes.

The melt viscosities of these maleated polypropylene products such as Epolene E43 were low, in the range of 200–400 cP at 190° C. Amounts of these low melt viscosity maleated polypropylene waxes which could be incorporated into floor polish formulations were limited because large amounts gave final floor finishes with less than desirable toughness. The addition of other components to the floor polish formula was needed to compensate for the poor toughness of these maleated polypropylenes. Higher viscosity maleated polypropylenes would be advantageous in that less or no additives would be necessary to obtain the desired toughness in the final floor finish.

Attempts were made to increase the melt viscosity of products by the substitution of higher molecular weight/melt viscosity starting materials. However, maleated products having higher melt viscosities gave solids which could not be emulsified in that large amounts of solid were insoluble in the emulsion mixture. Even after filtration of the insoluble solids the emulsions remained opaque. Thus commercial use of these higher viscosity products was precluded.

In light of the above, it would be very desirable to be able to produce maleated polypropylene waxes that are emulsifiable and produce clear emulsions that result in tough floor finishes.

SUMMARY OF THE INVENTION

The process for the preparation of an emulsifiable polypropylene wax according to the present invention comprises reacting at a temperature below 190° C. up to 10 wt % maleic anhydride and a thermally degraded polypropylene wax having a melt viscosity below 1000 cP (at 190° C.) in the presence of a free radical source for a sufficient time to produce a maleated polypropylene wax having a significantly increased melt viscosity, that is at least 1000 cP (at 190° C.), wherein the reaction temperature is also at or above the melting point of said thermally degraded polypropylene wax.

The maleated polypropylene produced according to the present invention has a melt viscosity of at least 1,000 at 190° C. and can be formed into an emulsion that has an emulsion light transmittance of at least 10% at 525 nm with a 20 mm light pathlength.

The emulsion containing the maleated polypropylene wax can be in the form of a clear floor polish formulation that provides a tough floor finish.

DETAILED DESCRIPTION OF THE INVENTION

The applicants have unexpectedly discovered a process for producing an emulsifiable polypropylene wax of high melt viscosity that is useful in producing clear floor polish formulations that result in tough floor finishes.

The process of the present invention preferably comprises reacting at a temperature of 165° to 180° C. up to 10 wt % maleic anhydride and a thermally degraded polypropylene wax having a melt viscosity between 400 and 800 cP (at 190° C.) in the presence of a free radical source for a sufficient time to produce a maleated polypropylene wax having a significantly increased melt viscosity that is at least 2000 cP (at 190° C.).

The maleated polypropylene wax of the present invention is preferably formed into an emulsion containing water and surfactant. This emulsion preferably comprises about 10 to 30 wt % of a maleated polypropylene wax having a melt viscosity of at least 2000 cP at 190° C., a minor amount up to about 15 wt % surfactant, and about 60 to 90 wt % water wherein the emulsion has a light transmittance of at least 10% at 525 nm with a 20 nm light pathlength.

The emulsion of the maleated polypropylene wax is preferably prepared according to the process comprising mixing at an elevated temperature under neutral or basic conditions about 10 to 30 wt % of said maleated polypropylene wax, a minor amount up to 15 wt % of a surfactant, and about 60 to 90 wt % water for a period of time sufficient to produce an emulsion of said maleated polypropylene wax.

The emulsion is preferably in the form of a floor polish formulation and is applied to a substrate such as a floor and then dried to provide a clear tough floor finish that has improved scuff and black heel mark protection.

The maleation process according to the present invention is conducted at a temperature above the melting point of the thermally degraded polypropylene wax but yet below 190° C. This maleation temperature is generally between 165° and 190° C. but is preferably conducted below 180° C. At temperatures much below 165° C. the thermally degraded polypropylene wax will not be in the molten form and therefore will not adequately react with the maleic anhydride. However, temperatures above 190° C. and in some instances above 180° C. do not produce an emulsifiable maleated polypropylene wax and the melt viscosity of the resulting maleated polypropylene wax is not as high as preferred. The maleation process of the present invention is preferably conducted at a temperature between 165° and 180° C., more preferably at a temperature of about 170° C.

The amount of maleic anhydride used in maleating the polypropylene wax can be up to 10 wt % based on the total of maleic anhydride and polypropylene wax and is preferably about 6 to 10 wt %, and more preferably 7 to 9 wt % with a weight percent of maleic anhydride of about 8 being most preferred. Amounts of maleic anhydride much over 10 wt % tend to cause the color of the resulting maleated polypropylene wax to be dark, whereas the lower amounts do not adequately react with the polypropylene wax to provide a clear emulsion or react very slowly.

The thermally degraded polypropylene wax or low molecular weight polypropylene wax is prepared by thermally degrading conventional high molecular weight polypropylene that is prepared by a conventional polymerization process such as disclosed in U.S. Pat. No. 2,969,345. The disclosures of which are incorporated herein by reference in their entirety. The polypropylene is preferably a homopolymer and contains less than 10% comonomer. The thermal degradation of the polypropylene is accomplished by heating at elevated temperatures causing the polymer chain to rupture. The degree of degradation is controlled by reaction time and temperature to give a thermally degraded low molecular weight crystallizable polypropylene having a melt viscosity less than 1000 cP at 190° C. (ASTM-D1238-57T using 0.04±0.0002 inch orifice) and an inherent viscosity of about 0.1 to 0.5. By carefully controlling the time, temperature and agitation, a thermally degraded polypropylene of relatively narrower molecular weight range than the starting high molecular weight polypropylene can be obtained. The degradation is carried out at a temperature from about 290° C. to about 425° C. These low viscosity polypropylenes prepared by thermal degrading conventional high molecular weight polypropylene are not emulsifiable as such. The melt viscosity of these thermally degraded polypropylenes are below 2400 cP (at 190° C.), preferably below 1500 (at 190° C.), more preferably below 1000 cP (at 190° C.). The melt viscosity of these thermally degraded polypropylenes preferably range between 400 and 800 cP at 190° C., preferably 500 to 700 cP with a melt viscosity of about 600 cP at 190° C. being most preferred. We have discovered that the higher the melt viscosity of polypropylene used in the reaction, the more likely the reaction will produce insoluble solids. At very low melt viscosities, however, the reaction produces maleated polypropylene waxes that do not provide very tough floor finishes.

Suitable free radical sources are, for example, peroxides such as ditertiary butyl peroxide, tertiary butyl hydroperoxide, cumene hydroperoxide, p-menthane peroxide, p-menthane hydroperoxide or azo compounds, such as azobis (isobutyronitrile), or irradiation sources. Suitable irradiation sources include, for example, those from cobalt, uranium, thorium sources, and the like and ultraviolet light. The preferred free radical agents are the peroxides with the butyl peroxides being more preferred. The most preferred peroxide, due to availability and suitable good results obtained thereby, is ditertiary butyl peroxide (di-t-butyl peroxide). The amount of peroxide or free radical agent used is generally quite low being of the order of about 0.01 to about 5% based on the weight of the polypropylene, preferably about 0.1 to 1 wt % with about 0.15 to 0.25 wt % being most preferred. Amounts much above 5 wt % are not needed for good properties whereas amounts below about 0.01 wt % provide reactions that are too slow and incomplete.

The maleation of the thermally degraded polypropylene according to the present invention is preferably conducted in a solvent for safety reasons. Suitable solvents include ketones and other hydrocarbon solvents with the higher volatile solvents being more preferred due to the ease in solvent removal from the non volatile maleated polypropylene wax. Acetone is the more preferred solvent due to availability and ease in solvent removal. The reaction can be carried out either in the batchwise or continuous manner with contact times in order of about 10 minutes to about 2 hours. A preferred method, however, due to reproducibility is batchwise.

The unreacted maleic anhydride can be separated from the reaction mixture by purging the reaction mixture with an inert gas while the reaction mixture is at the reaction temperature. After the unreacted maleic anhydride has been removed, the maleated polypropylene wax can be further purified by a vacuum stripping, solvent extraction, or dissolving in an aqueous medium and isolated by removing the solvent or water.

The maleated polypropylene waxes of the present invention generally have a melt viscosity that is significantly increased over the melt viscosity of the thermally degraded polypropylene reactant. The melt viscosity of the maleated polypropylene wax produced according to the present invention has a melt viscosity above 1000 cP at 190° C. but usually well above 2000 cP at 190° C., preferably above 3000 cP at 190° C., with a melt viscosity of over 3800 cP at 190° C. being most preferred. The melt viscosity range of this maleated polypropylene wax is generally from 1000 to 5000 cP at 190° C., preferably 1500 to 4500 cP, with a melt viscosity range of 2000 to 4000 cP at 190° C. being most preferred.

The maleated polypropylenes produced according to the present invention generally have an acid number over 40 preferably between 45 and 60 with acid numbers over 50 being most preferred. Maleated polypropylene waxes with acid numbers above 60 generally darker in color whereas maleated polypropylene waxes with acid numbers below 40 generally are not very emulsifiable.

The maleated polypropylene waxes produced according to the present invention have unexpectedly increased melt viscosities but yet are emulsifiable and produce clear floor polished formulations. Emulsions prepared from the maleated polypropylene waxes of the present invention generally have a % light transmittance over 5% at 525 nm at 20 mm pathlength. Maleated polypropylene waxes with an emulsion light transmittance over 10% are easily produced. Maleated polypropylene waxes with an emulsion light transmittance over 20% are preferred, more preferably over 30% with those having emulsion light transmittances as high as 49% being the most preferred.

The maleated polypropylene waxes produced according to the present invention are formed into emulsions according to the process comprising mixing at an elevated temperature under neutral or basic conditions about 10 to 30 wt % of said maleated polypropylene wax, a minor amount up to 15 wt % of a surfactant, and about 60 to 90 wt % water for a period of time sufficient to produce an emulsion of said maleated polypropylene wax.

The emulsion temperature is preferably between 160° and 180° C., more preferably between 165° and 178° C. with a temperature of about 170° to 175° C. being most preferred. The emulsion is prepared at neutral or basic pH. However, it is preferred that the pH be between 7 and 10, preferably between 9 and 10 with a pH between 9.5 and 9.7 being most preferred.

The emulsions prepared according to the present invention generally contain about 10 to 30 wt % maleated polypropylene wax preferably 20 to 27 wt % with a weight percent of maleated polypropylene wax of about 21 to 23 wt % being most preferred. Amounts of maleated polypropylene wax much above about 30 wt % and much below 10% are not as emulsifiable. The amount of surfactant used in the emulsions of the present invention can be as high as 15 wt % but is preferably between 5 and 10 wt % with a wt % of about 6 to 8 being more preferred. Amounts much over 15 wt % are not needed to render the amount of maleated polypropylene wax dispersible in the water. However, minor amounts below 3 wt % do not adequately disperse the maleated polypropylene wax. Examples of suitable surfactants include Ingepal CO-630, Ingepal CO-710, nonylphenyl, and ethoxylated alcohols such as Tergitol 15-S-9 and Tergitol 15-S-12.

The amount of water generally varies depending upon the desired concentration but is generally between 60 and 90 wt %, preferably between 73 and 80 wt % with a wt % of about 70 to 79 wt % water being most preferred. A base is generally added to the emulsion to render the aqueous solution basic. Amounts of base range from 1 to 3 wt % and are generally selected from standard bases such as tertiary amines and potassium hydroxide. Amounts of base generally range from about 0.05 to 3 wt %, preferably 0.75 to 1.5 wt %, more preferably, 0.8 to 1.2 wt % with about 1 wt % base being most preferred. If an emulsion is attempted under acidic conditions, an emulsion will not form.

The emulsion can also contain other ingredients such as bleaching agents or whitening agents such sodium metabisulfite in concentrations as high as 0.34 wt %. The bleaching agent is preferably in the range of 0.1 to 0.34 wt %, more preferably 0.15 to 0.34 with an amount of bleaching agent of about 0.29 to 0.31 ? being most preferred. The bleaching agent or whitening agent is generally not needed. However, minor amounts often do decrease the color.

The floor polishes of the present invention are generally emulsions of the maleated polypropylene wax but generally contain additional materials as used in standard floor polishes such as coalescing aids, acrylic polymers, plasticizers and polyethylene waxes. The amounts of coalescing aids such as glycol ethers can vary from 1 to 10 wt %, preferably 1 to 8 wt % with an amount of about 4 wt % being most preferred. The amount of acrylic polymers such as styrene acrylic copolymers can vary from 10 to 20 wt %, preferably 8 to 15 wt % with an amount of about 6 to 12 wt % being most preferred. The plasticizers can vary from 1 to 5 wt %, preferably 1 to 4 wt % with an amount of about 1.5 to 3 wt % being most preferred. The amounts of waxes can vary from 0.4 to 3 wt %, preferably 0.5 to 2 wt % with an amount of about 1.2 to 1.5 wt % being most preferred.

Other materials that can be present in the floor polishes include preservatives, silicone antifoam, fluocarbon surfactant, and zinc oxide.

Floor finishes produced from the floor polish formulations using the maleated polypropylene waxes of the present invention have improved scuff and black heel mark protection when compared to floor polishes without this wax. The floor finishes produced from the emulsions containing the maleated polypropylene waxes in the present invention generally have a scuff protection of 2 to 3, with a scuff protection of 2 being most preferred. These floor finishes also have a black heel mark protection of 2 to 3, with a black heel mark protection of 2 or less being most preferred.

The floor finishes can be obtained by applying the floor polish formulations by standard methods such as applying to the substrate and drying. The dry coating can also be buffed.

The following examples are intended to illustrate the present invention but should not be interpreted as a limitation thereon.

EXAMPLE 1

The maleation of a polypropylene wax to provide a product wax which yields a highly clear emulsion was carried out as follows: To an appropriate resin kettle equipped with a nitrogen gas sweep or blanket, a motor driven stirrer, appropriate temperature control devices, a dropping funnel, and an outlet leading to a Dean Stark trap and glycol cooled reflux condenser was added 1000 g. of Epolene N15, (a polypropylene wax from Eastman Chemical Company with a melt viscosity of 600 cP at 190° C.). The temperature of the kettle was heated to and maintained at 180° C. When the system had stabilized at 180° C. the nitrogen sweep was changed to a nitrogen blanket. At this point a solution of 100 g. of maleic anhydride and 20 g. of di-t-butyl peroxide in the minimum amount of acetone (about 150 ml) was added over a 30 minute period. Stirring was continued for an additional 10 minutes. The nitrogen blanket was changed to a vigorous sweep for 10 additional minutes. The molten product of the reaction was then poured out to harden in air. The following properties of the solid product were found: Acid number=50.7; melt viscosity at 190° C.=2725 cP.

An emulsion of the maleated polypropylene wax product above was prepared by heating a mixture of 40 g. of the maleated polypropylene wax, 12 g. of Igepal CO-630 (a surfactant from Rhone Poulenc Inc.) 0.4 g. of sodium meta bisulfite, 4.5 g. of potassium hydroxide, and 130 g. of water to 175° C. for 0.5 hr. (transmittance of the emulsion from this product prepared in this way was 19.1% at 525 nm with a 20 mm light pathlength). A similar emulsion prepared from 40 g of Epolene E43 provided a transmittance of only 4%.

A floor test which utilized a heavily traveled walkway leading to a cafeteria was performed by substituting a 50/50 mixture of the above wax and Epolene E20 (a high density polyethylene wax from Eastman Chemical Company) into two different floor polish formulas (designated A and B below) in place of the usual wax component. These are industrial/institutional floor finishes formula A is designed to be maintained by ultra high speed buffing and formula B is designed for spray buffing. The floor test panels which were used were 3' by 3' and covered with either white or black vinyl composition tiles. Six coats of finish were applied to these test panels. Half of these panels (those utilizing formula A) were maintained by ultra high speed burnishing at 2000 rpm with a propane buffer and cream colored UHS pad. The other half of these panels (those utilizing formula B) were maintained by spray buffing with a 175 rpm buffer and a white pad. Eleven buffings were carried out over a 9 week period. These results are shown in Table I

TABLE I

Analysis of Test Panels after 9 Weeks of Walkway Exposure

| Test | Formula A[1] Control[3] | Formula A[1] WAX MIX | Formula B[2] Control[3] | Formula B[2] WAX MIX |
|---|---|---|---|---|
| 60° gloss after coating | | | | |
| white vinyl | 88 | 88 | 90 | 89 |
| black vinyl | 86 | 85 | 86 | 86 |
| at end of test | | | | |
| white vinyl | 83 | 85 | 70 | 72 |
| black vinyl | 84 | 84 | 72 | 69 |
| Scuff/scratch | | | | |
| white vinyl | 4 | 5 | 3 | 4 |
| black vinyl | 5 | 5 | 5 | 4 |
| Black heel mark | | | | |
| white vinyl | 5 | 4 | 3 | 3 |
| Repair | | | | |
| white vinyl | 4 | 2 | 2 | 3 |
| black vinyl | 3 | 3 | 2 | 2 |
| Overall | | | | |
| white vinyl | 4 | 3 | 3 | 3 |
| black vinyl | 3 | 3 | 4 | 3 |

[1]Formula A = S. C. Johnson & Son, Inc. Sprint Finish Ultra, High Speed Floor Finish
Containing in Wt %
- 10-20 Styrene/Acrylic Polymers
- 3-6 Glycol Ether CAS No. 34590-94-8
- 1-2 Glycol Ether CAS No. 111-90-0
- 1-3 Ammonium Hydroxide
- 70-85 Water CAS No. 7732-18-5
- 0.3-0.6 Zinc Oxide CAS No. 1314-13-2
- 1.3-1.5 Maleated Polypropylene Wax and Polyethylene Wax

[2]Formula B = S. C. Johnson & Son, Inc. Vectra Floor Finish
Containing in Wt %
- 1-5 Glycol Ether CAS No. 111-90-0
- 1-5 Glycol Ether CAS No. 3490-94-8
- 1-3 Tributoxyethyl Phosphate CAS No. 78-51-3
- 10-20 Styrene/Acrylic Polymers
- 70-80 Water CAS No. 7732-18-5
- <0.5 Zinc Oxide CAS No. 1314-13-2
- <0.2 Potassium Hydroxide CAS No. 1310-58-3
- 1-3 Ammonium Hydroxide CAS No. 1336-21-6
- 1.3-1.5 Polypropylene Wax and Maleated Polypropylene Wax

[3]The wax in the control formula was a mixture of Epolene E43 and a commercially available high density polyethylene wax. The wax in the WAX MIX was a 50/50 mixture of Epolene E20 and the new wax prepared in this work above. The wax mix was added to both Formula A and B in amounts equal to the total amount of wax contained in the control.

The panels were removed from the walkway and analyzed in the laboratory under a bright light. Table II depicts the results of this analysis.

TABLE II

Final Black Heal Mark and Scuff/Scratch Evaluation in Bright Light

| | Formula A Control | Formula A WAX MIX | Formula B Control | Formula B WAX MIX |
|---|---|---|---|---|
| White vinyl | good | excellent | good | fair |
| Black vinyl | good | excellent | good | good |

For relative slip resistance measurements the WAX MIX was superior to the control for formula A and equal for formula B.

EXAMPLE 2

Laboratory experiments were conducted on two clear household floor finishes. Formula C is an experimental formula from L & F products cited in U.S. Pat. No. 4,869,934, Sep. 16, 1988, Sterling Drug and has the following components:

| Formula C | | |
|---|---|---|
| | Wt % | |
| Component | Amount Used | Range |
| Addition polymer (acrylic) | 31.2 | 15–45 |
| Alkali soluble resin (15%) | 9.3 | 1–3 |
| Coalescing aid (glycol ether) | 7.0 | 5–15 |
| Antifoam (silicone type) | 0.003 | 0.025–0.004 |
| Fluorocarbon surfactant (40%) | 0.03 | 0.01–0.05 |
| Tributoxyethyl phosphate | 1.6 | 1–3 |
| Preservative | 0.05 | 0.05–1.0 |
| Ammonium hydroxide | 2.6 | 2.0–3.0 |
| Water | *Q.S. | *Q.S. |
| | 100.0 | 100.0 |
| pH | 8.3 | 8.0–9.6 |
| Non-volatile solids | 15.7% | 10–25 |

*Quantum sufficient to be 100%

Formula D is Future, a commercially available product from S. C. Johnson & Son, Inc.

The emulsified wax was added in increments to floor finishes C and D.

| | Gloss[2] 20°/60° | Scuff/Black Heel Mark Resistance[3] |
|---|---|---|
| Formula C | | |
| Control (no wax) | 30/71 | 3 (Good) |
| 1% Wax emulsion[1] | 35/75 | 2 (Very good) |
| Formula D | | |
| Control (no Wax) | 52/83 | 3 (Good) |
| 1% Wax emulsion[1] | 41/77 | 2 (Very good) |
| 3% Wax emulsion[1] | 60/87 | 2 (Very good) |

[1] The wax was a maleated polypropylene wax prepared in Example 1.
[2] Specular gloss, ASTM D523-85
[3] Rubber heel marking of non buffable floor polishes, CSMA (Chemical Specialties Manufacturers Association) Bulletin 9-73

In both finishes C and D, an increase in scuff/black heel mark resistance was obtained. In some instances the gloss was also improved.

EXAMPLE 3

The same type product was prepared as above from 2000 g. batches of 600 cP melt viscosity polypropylene wax (Epolene N15). For convenience addition times were extended to one hour, followed by one hour of stirring. The vigorous nitrogen sweep was extended to one half hour. Preparations at 180° C. were not always consistent in that the product was not always soluble in the emulsion. In addition melt viscosities were not always over 2000 cP. Table III shows these inconsistencies.

TABLE III

| | Properties of Maleated Polypropylene Wax | | | | | |
|---|---|---|---|---|---|---|
| | Reagents | | Product Characteristics | | | Character |
| Sample No. | MA g. | DTBP g. | Acid No. | Viscosity @ 190° C. | R/B° C. | of emulsion % T |
| 1 | 180 | 60 | 45 | 1600 | 156 | partly insoluble |
| 2 | 180 | 60 | 39 | 2250 | 159 | partly insoluble |
| 3 | 180 | 60 | 41 | 2400 | 158 | partly insoluble |
| 4 | 180 | 60 | 47 | 2440 | 158 | partly insoluble |
| 5 | 180 | 60 | 48 | 1600 | 157 | partly insoluble |
| 6 | 200 | 60 | 48 | 1245 | 156 | 36.6 |
| 7 | 200 | 60 | 50 | 2195 | 156 | 44.1 |
| 8 | 200 | 60 | 48 | 1212 | 156 | 25.0 |
| 9 | 200 | 60 | 32 | 1200 | 161 | partly insoluble |
| 10 | 200 | 60 | 30 | 1575 | 161 | partly insoluble |
| 11 | 200 | 60 | 29 | 1440 | 161 | partly insoluble |
| 12 | 200 | 60 | 30 | 2025 | 160 | partly insoluble |
| 13 | 200 | 70 | 67 | 500 | 154 | 21.5 |
| 14 | 200 | 70 | 51 | 1910 | 156 | partly insoluble |
| 15 | 200 | 70 | 53 | 895 | 154 | 36.1 |
| 16 | 200 | 70 | 48 | 1581 | 156 | 26.4 |
| 17 | 200 | 70 | 51 | 840 | 154 | 31.9 |
| 18 | 200 | 70 | 51 | 748 | 154 | 14.1 |
| 19 | 200 | 75 | 51 | 630 | 153 | 7.4 |
| 20 | 200 | 80 | 54 | 840 | 154 | 36.1 |
| 21 | 200 | 80 | 55 | 700 | 155 | 40.5 |
| 22 | 200 | 90 | 51 | 712 | 153 | 23.6 |

EXAMPLE 4

The product prepared in this example was conducted according to Example 1 except that the kettle and preparation temperature were at 170° C., and the amounts were as follows: 2000 g wax, 220 g. MA, 60 g. DTBP. For each preparation the melt viscosity of the product was over 2000 cP. The % transmission (20 mm pathlength, 525 nm) of the emulsion prepared as above in Example 1 was always over 39%. Table IV shows this data for the products.

TABLE IV

| Properties of Higher Viscosity E43's Prepared at 170° C. | | | |
|---|---|---|---|
| Acid Number | Melt Viscosity @ 190 deg. | R/B deg. C. | Emulsion % T |
| 1 | 58.0 | 2175 | 153.9 | 47.3 |
| 2 | 55.9 | 3150 | 157.2 | 47.2 |
| 3 | 55.4 | 3438 | 154.8 | 48.1 |
| 4 | 53.8 | 2010 | 154.8 | 49.8 |
| 5 | 55.1 | 2370 | 155.0 | 46.5 |
| 6 | 52.2 | 3510 | 155.8 | 43.0 |
| 7 | 57.0 | 2425 | 154.1 | 49.6 |
| 8 | 58.2 | 2240 | 154.7 | 48.6 |
| 9 | 55.0 | 3825 | 155.5 | 39.9 |

EXAMPLE 5

This example was prepared as in Example 4 above except that the maleated polypropylene waxes were prepared from a higher viscosity starting polypropylene wax (2400 cP melt viscosity at 190 deg. C.). The results are illustrated below in Table V.

TABLE V

| Maleated Product from Higher Viscosity Polypropylene Wax | | | | |
|---|---|---|---|---|
| Sample No. | Acid Number | Melt Viscosity @ 190 deg. | R/B, deg. C. | Emulsion % T |
| 1 | 54.0 | 3400 | 157.3 | much insol. solid |
| 2 | 49.4 | 4113 | 158.2 | much insol. solid |
| 3 | 51.8 | 3100 | 157.0 | much insol. solid |

We claim:

1. A process for the preparation of an emulsifiable polypropylene wax comprising reacting at a temperature below 190° C. up to 10 wt % maleic anhydride and a thermally degraded polypropylene wax having a melt viscosity below 1,000 cP (at 190° C.) in the presence of a free radical source for a sufficient time to produce a maleated polypropylene wax having a significantly increased melt viscosity that is at least 1000 cP (at 190° C.) wherein the reaction temperature is also at or above the melting point of said thermally degraded polypropylene wax.

2. The process according to claim 1 wherein the reaction temperature is between 165° and 180° C. using a thermally degraded polypropylene wax having a melt viscosity between 400 and 800 cp at 190° C.

3. The process according to claim 1 wherein the free radical source is a peroxide present in a concentration of about 0.1 to 5% based on the weight of the polypropylene.

4. The process according to claim 1 further comprising mixing at an elevated temperature under neutral or basic conditions about 10 to 30 wt % of said maleated polypropylene wax, a minor amount up to 15 wt % of a surfactant, and about 60 to 90 wt % water for a period of time sufficient to produce an emulsion of said maleated polypropylene wax.

5. The process according to claim 4 wherein the emulsion is prepared at a temperature of about 160° to 180° C. at a pH between 7 and 10.

6. The process according to claim 4 wherein the maleated polypropylene wax is present in the concentration of about 20 to 27 wt % based on the total of maleated polypropylene wax and water.

7. The process according to claim 4 further comprising applying the emulsion to a substrate, and drying the coated substrate.

* * * * *